United States Patent [19]

Gerbe et al.

[11] Patent Number: 5,453,877
[45] Date of Patent: Sep. 26, 1995

[54] OPTICAL SYSTEM OF COLLIMATION NOTABLY FOR HELMET DISPLAY UNIT

[75] Inventors: Jean-Pierre Gerbe, Pessac; Jean-Blaise Migozzi, Orsay, both of France

[73] Assignee: Thomson-CSF, Puteaux, France

[21] Appl. No.: 424,200

[22] Filed: Oct. 19, 1989

[30] Foreign Application Priority Data

Oct. 21, 1988 [FR] France ................................. 88 13829
Mar. 10, 1989 [FR] France ................................. 89 03152

[51] Int. Cl.⁶ .................................................. G02B 27/14
[52] U.S. Cl. ........................ 359/633; 359/630; 359/631
[58] Field of Search ................................. 350/172, 174, 350/3.7, 3.72; 340/705; 359/618, 629–633, 641

[56] References Cited

U.S. PATENT DOCUMENTS

| | | | |
|---|---|---|---|
| 3,923,370 | 12/1975 | Mostrom | 350/174 |
| 4,669,810 | 6/1987 | Wood | 350/3.72 |
| 4,711,512 | 12/1987 | Upatnieks | 350/174 |
| 4,729,634 | 3/1988 | Raber | 350/174 |
| 4,830,464 | 5/1989 | Cheysson et al. | 350/174 |
| 4,859,030 | 8/1989 | Rotier | 350/172 |
| 4,874,214 | 10/1989 | Cheysson et al. | 350/174 |

FOREIGN PATENT DOCUMENTS 0269259   6/1988   European Pat. Off. .
1578136  11/1980   United Kingdom .

OTHER PUBLICATIONS

NAECON '77 Record; pp. 981–990, "Advanced Head–Up Display Technology—The Integrated HUD", Coonrod et al.
"Head–Up Displays—Part 2", Freeman—Optics Technology; Aug. 1969, pp. 175–182.
An Integrated Approach to Helmet Display System Design, SPIE, vol. 778, Display System Optics, 1987, pp. 83–88; J. E. Melzer, et al.

*Primary Examiner*—Paul M. Dzierzynski
*Assistant Examiner*—Thong Nguyen
*Attorney, Agent, or Firm*—Oblon, Spivak, McClelland, Maier & Neustadt

[57] ABSTRACT

The system is designed to be mounted in a air pilot's helmet. It uses a confocal assembly with a first parabolic mirror and a second parabolic mirror, placed downline of a collimation objective which gives a collimated radiation. The first mirror is totally reflective and the second mirror is semi-transparent to simultaneously transmit, by reflection, the collimated radiation and, by transparency, for example the view of the external landscape. These two mirrors are integrated into the ends of a plate with two parallel faces. The collimated radiation penetrates the plate by one of the parallel faces, gets reflected on the first mirror, undergoes a succession of total reflections on the parallel faces and then gets reflected on the second mirror before leaving the plate, still doing so through one of the two faces.

1 Claim, 5 Drawing Sheets

FIG_2

OPTICAL SYSTEM OF COLLIMATION NOTABLY FOR HELMET DISPLAY UNIT

BACKGROUND OF THE INVENTION

1. Field of the Invention

The present invention concerns an optical system of collimation that is designed to be mounted on a helmet worn by an observer, that is, a system designed to form a helmet display unit. Its application is more particularly envisaged in the field of aeronautics.

2. Description of the Prior Art

In military aircraft and combat helicopters, the pilot needs to be presented with piloting and fire control information superimposed on the external landscape. This information role is currently fulfilled by the head-up visor present in all modern military aircraft and in certain helicopters. The drawback of this type of display is that it can show an image only in a limited field which is always centered in the axis of the aircraft. By contrast, the pilot may have to do sightings away from the axis of the aircraft, whence the idea of a display related to the position of the pilot's head. A concept such as this requires, firstly, a system enabling the head position to be detected and, secondly, enabling a light image to be prepared and collimated. These two systems have to be placed on the pilot's helmet, and this fact entails very great constraints, notably on weight.

The following are the essential characteristics that ought to be taken into account in making such systems:

minimal visual interference: the optical system collimating the image should offer the least possible hindrance to the view of the outside environment, and should also prevent the creation of a mask in the field of vision;

safety: since the optical system is close to the eye, it should be seen to it that the eye will not be injured in the event of any impact;

weight: the weight should be minimal. Notably, if the system is designed to be mounted on a military aircraft, it should be as light as possible to prevent fatigue, especially under a heavy load factor.

Furthermore, the collimation system should have performance characteristics generally providing for a wide field, resolution compatible with the eye and high luminosity.

In the SPIE document, *Display System Optics*, vol. 778 (1987), an article by James E. MELZER and Eric W. LARKIN, "An Integral Approach to Helmet Display System Design", pp. 83 to 88, describes a helmet display system comprising: a generator or source of a synthetic light image to be collimated, a collimator or objective for the collimation of the light radiation corresponding to the synthetic image and a combining optical system or combiner formed by a confocal assembly of two parabolic mirrors, a first mirror reflecting the radiation of the collimated image towards the second mirror, which is partially reflective to reflect this radiation towards the observer and simultaneously enables the transmission of the radiation that comes from the exterior and is included in the field of the system. Furthermore, the helmet display unit includes a number of returning mirrors to deflect the optical path and enable assembly on a helmet. In this prior art assembly, the parabolic mirrors work off axis, which is a cause of aberrations and reduces the quality of the image unless the field of the visor is quite severely restricted.

SUMMARY OF THE INVENTION

An aim of the invention is to overcome these drawbacks, especially by improving the optical system between the two parabolic mirrors.

According to the present invention, there is provided an optical system of collimation comprising in series: a generator or source of images to provide a light radiation, a collimation objective or collimator to collimate the radiation, a combiner comprising a confocal assembly with a first parabolic mirror and a second parabolic mirror and a transparent plate, the first mirror being reflective to reflect the collimated radiation towards the second mirror, and the second mirror being partially transparent to enable, simultaneously, the transmission by reflection, towards an observer, of the radiation received from the first mirror, and the transmission by transparency, towards the observer, of an external radiation, the transparent plate having two ends, a first face and a second face which are parallel, the two ends being formed, respectively, by the two parabolic mirrors, and wherein the optical path of the collimated radiation between the objective and the observer comprises, subsequently, a first crossing of one of the two parallel faces, a reflection on the first mirror, several total reflections on the parallel faces, a reflection on the second mirror and a second crossing of one of the two parallel faces.

BRIEF DESCRIPTION OF THE DRAWINGS

The present invention shall be better understood from the following description, given by way of an example, with the help of the appended figures of which.

In the different figures, the corresponding elements are designated by the same references.

DETAILED DESCRIPTION OF THE PREFERRED EMBODIMENTS

Figure 1:
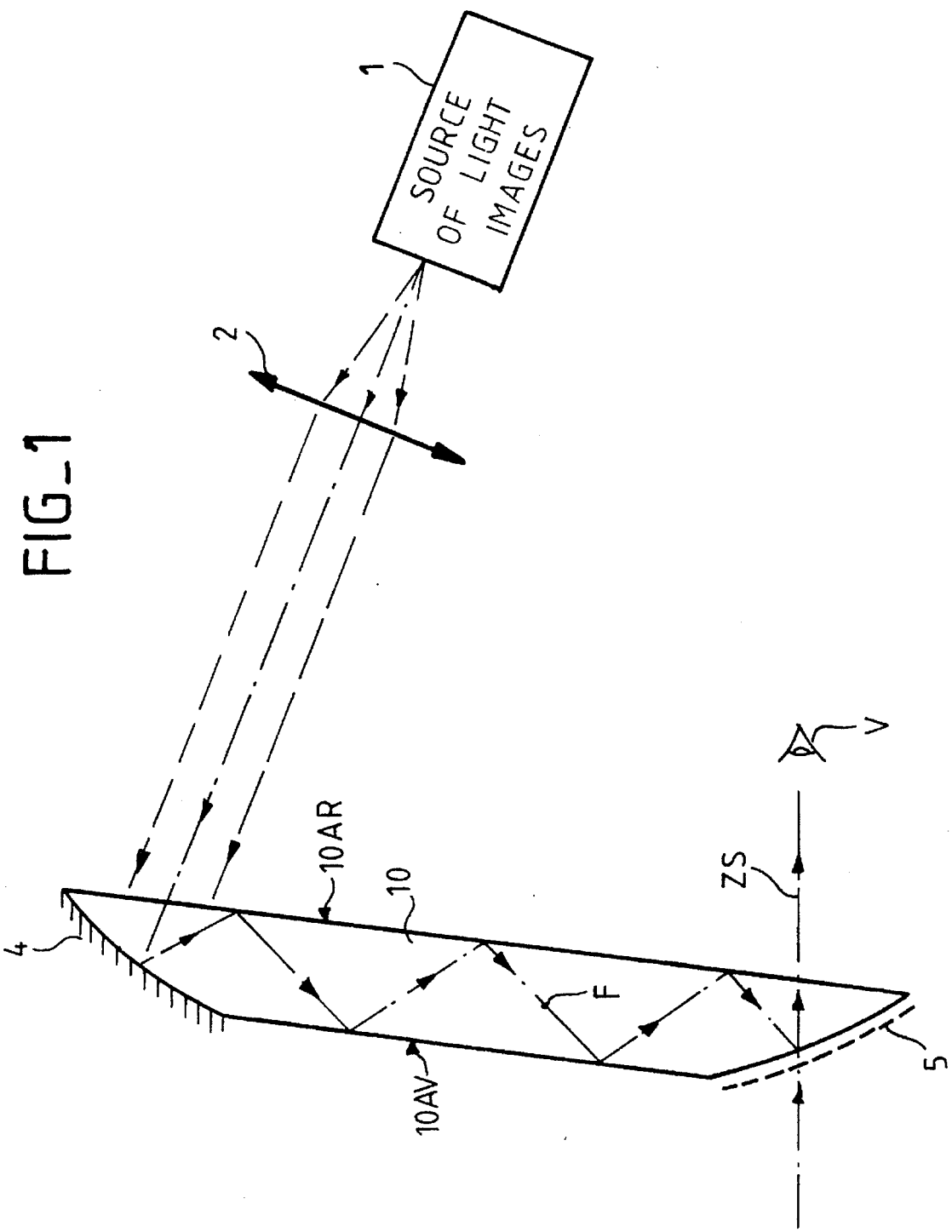
FIG. 1 is a simplified drawing of an optical system of collimation according to the invention.

FIG. 1 shows an optical system of collimation comprising, serially on one and the same optical path: a generator or source 1 of light images, a collimation objective or collimator 2, a first parabolic mirror 4 and a second parabolic mirror 5. The mirrors 4 and 5 form a confocal system. Their common focus F has been indicated in FIG. 1. The mirror 4 is totally reflective, and the mirror 5 is semi-transparent to let through the radiation coming from the external landscape.

The parabolic mirrors 4 and 5 are the ends of a conductor of light formed by a plate 10 made of a transparent material with two parallel faces 10AV, 10AR. The parabolic mirrors 4 and 5 form a confocal optical system of enlargement by 1.

The path taken by the rays is indicated by dots and dashes with arrows. This path is such that the radiation coming from the source 1 of images re-enters the plate and comes out, after reflection from the mirrors 4 and 5, through the same face 10AR. A design of this kind facilitates assembly on a helmet.

The collimator 2 forms the image, at infinity, of the light image prepared by the source 1 on a screen. In the example described, the source comprises a cathode-ray tube. In other embodiments, the source 1 may comprise a liquid crystal display panel or any other source of images. The collimated image penetrates the plate 10 and is reflected by the parabolic mirror 4, then by the parabolic mirror 5. The plate with parallel faces 10 provides for the optical routing between the mirrors 4 and 5 by a series of total reflections on its parallel faces.

The semi-transparent parabolic mirror 5 forms a combining optical system or combiner for it enables the mixing of the collimated radiation coming from the source 1 with the radiation that comes from the outside landscape and is transmitted, through the mirror 5, towards the observer symbolized by an eye V.

The total reflections internal to the plate 10 on the front face 10AV and rear face 10AR entail no loss of light, even if these faces are not treated. As the parabolic mirrors 4 and 5 form a confocal system, the image at the output of the mirror 5 is also sent back to infinity as it was at the input. As compared with a corresponding optical system which, however, has no plate with parallel faces, the mirrors and, in particular, the combining mirror 5 form a smaller angle with the sighting direction ZS, thus enabling the use of the mirrors 4 and 5 with a smaller axial offset and making it possible, in this way, to obtain wider fields while preserving a accurate quality of image.

All the total reflections internal to the plate 10 also contribute to making the image descend from above the observer's head, without it's being necessary to use parabolic returning mirrors with a big axial offset thus making it possible, here too, to obtain wide fields.

The processing of the combining mirror 5 is neutral in the example described. In other embodiments, it may be selective (filtering optical deposit or deposition of a hologram) to reflect only the spectral band of the image source (band located in the green region for the cathode-ray tube). As for the parabolic mirror 4, it is totally reflective because it is not used in transmission.

For the observer's view of the landscape or any other light pattern through the plate outside the field of the helmet display unit, i.e. outside the mirror 5, the plate 10 introduces practically no disturbance since the front face 10AV and the rear face 10AR are used in transmission for the radiation.

The left-hand and right-hand side faces of the plate 10 are bevelled in two planes, respectively, passing through the eye. Thus, the observer sees them exactly by the edge. This gets rid of the mask that they could create on the external view.

Figure 2:
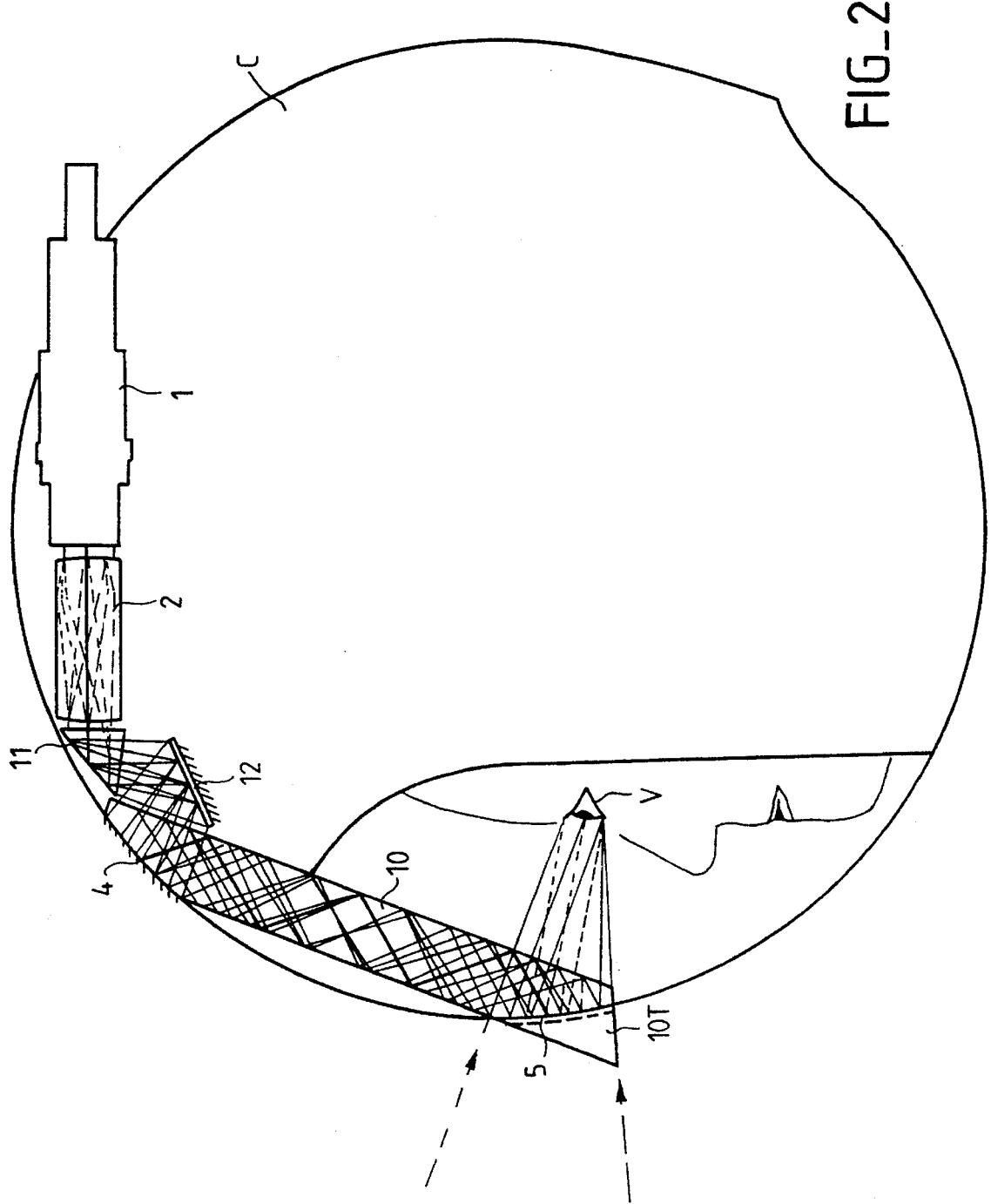
FIG. 2 is a more detailed drawing of an embodiment showing an optical system of collimation according to the invention.

FIG. 1 corresponds to a laboratory embodiment. FIG. 2 corresponds to an embodiment prepared by means of the teachings drawn from the embodiment according to FIG. 1. It has been specially designed to be mounted in a helmet C.

The concealed parts of the optical system of collimation according to FIG. 2 are depicted as seen by transparency through the external wall of the helmet C. This optical system is distinguished from the one according to FIG. 1 by the adding on of a prism 11 and a plane mirror 12, and by the fact that the plate 10 is extended downwards by a transparent terminal element 10T. The prism 11 and the mirror 12 are placed in series between the collimator 2 and the plate 10, and are designed to elongate the optical path to adapt the shape of the optical system to the shape of the helmet C. The terminal element 10T has a volume limited by: the mirror 5, the extensions of the front face, 10AV and of the side faces of the plate 10, and the plane passing through the eye and through the lower edge of the mirror 5.

The embodiment according to FIG. 2 has two optical systems of collimation associated with the helmet C to form a binocular display unit. The second system, which is identical to the first one, cannot be seen in FIG. 2.

Figure 3:
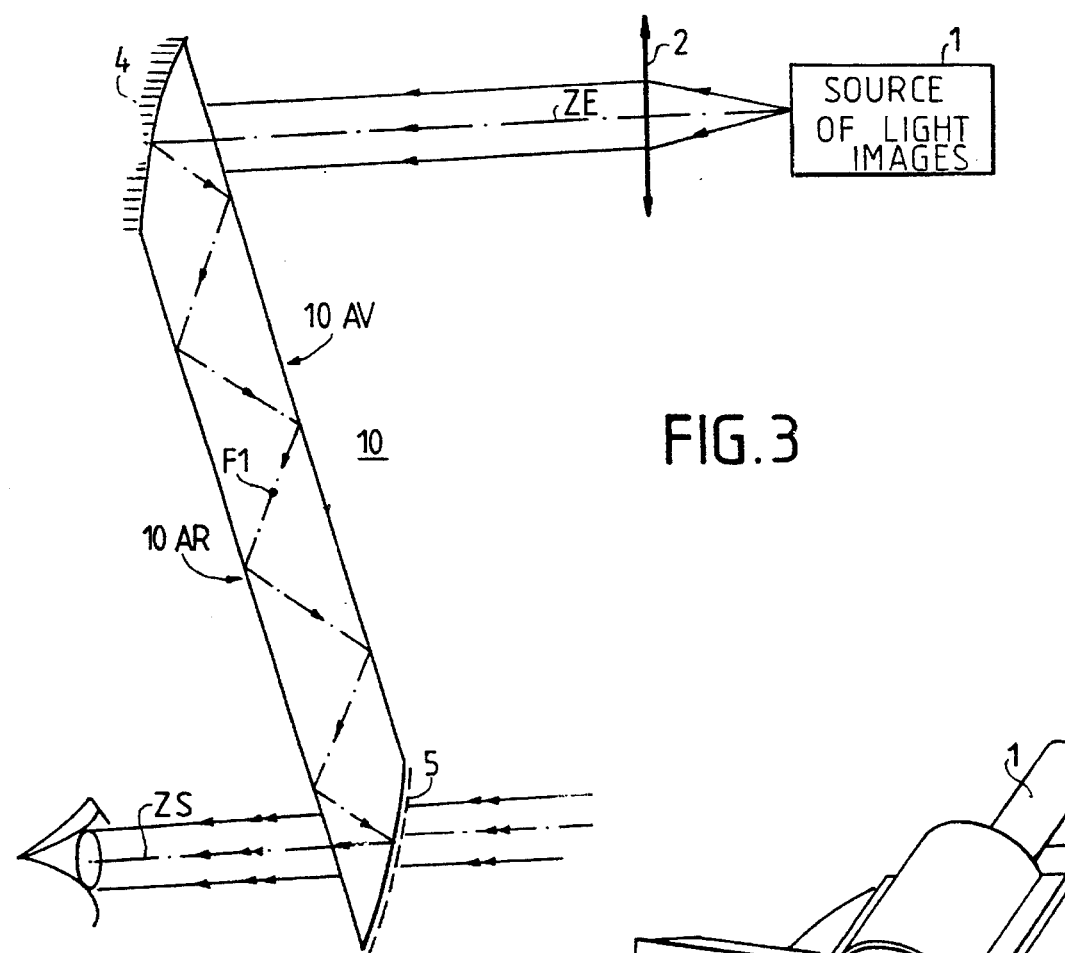
FIG. 3 is a simplified drawing of an optical system of collimation according to the invention.

The optical system of collimation according to FIG. 3 has a source 1 of light images, a collimator 2, a first parabolic mirror 4 and a second parabolic mirror 5. The mirrors 4 and 5 form a confocal system of enlargement by 1 and have a common focus F1. The mirror 4 is totally reflective and the mirror 5 is semi-transparent to let through the radiation coming from the outside landscape.

The parabolic mirrors 4 and 5 are placed at the end of a light conductor formed by a plate with parallel faces 10 made of a transparent material. The path taken by the rays is indicated, for the optical axis, in FIG. 3.

The collimator 2 forms the image, at infinity, of the light image prepared by the source 1. The collimated image is then reflected by the parabolic mirror 4 and reformed at output as a parallel radiation by the parabolic mirror 5. The plate with parallel faces ensures the intermediate optical routing by a series of total reflections on its parallel faces: the front face 10AV and the rear face 10AR.

The semi-transparent parabolic mirror 5 constitutes a combining mirror for it enables the mixing of the collimated radiation with the external radiation transmitted by this mirror towards the observer. In an application to a helmet display unit, this external radiation represents the view of the landscape in the field of the helmet display unit. This field is identified by the angle θ in the plane of the FIG. 4. It corresponds to the furthest inclinations of the rays transmitted by the optical system of collimation towards the observer.

The total internal reflections on the faces 10AV and 10AR of the plate 10 entail no loss of light, even if these faces 10AV and 10AR are not treated. Since the parabolic mirrors 4 and 5 form a confocal system, the image at the output of the mirror 5 is also sent back to infinity as it was at the input. The parabolic mirrors 4 and 5 are used off axis. A parabolic mirror gives a perfect image for an object at infinity and for an object at the focus. Furthermore, owing to the symmetry of the system, certain aberrations are compensated for. By contrast, the curvature of the field has to be corrected at the collimator. By means of the plate 10 the mirror and, in particular, the combining mirror 5 may have a small angle with the vertical to the sighting direction (output optical axis ZS, FIG. 1), thus making it possible to use the mirrors 4 and 5 with a small axial offset and to thus obtain wider fields while preserving accurate image quality as compared with a system having no optical conductor with an intermediate plate.

All the total internal reflections also contributes to making the image descend from above the observer's head (FIG. 4 and FIG. 5) without having to use mirrors with a big axial offset, thus enabling wide fields to be obtained.

The treatment of the combining mirror 5 may be neutral or selective (filtering optical deposit or deposition of a hologram) to reflect only the spectral band of the image source (band located in the green region for a cathode-ray tube). The other parabolic mirror, 4, is totally reflective because it is not used in transmission.

For the observer's view of the landscape or of another light pattern through the plate outside the field of the helmet display unit, hence outside the mirror 5, the plate 10 introduces practically no disturbance since the front face 10AV and the rear face 10AR are used in transmission for this radiation.

The left-hand side face 10LG and right-hand side face 10LD of the plate 10 are cut slantwise with respect to the parallel plates, so as to converge on the eye. Thus, the observer sees them exactly by the edge. This gets rid of the mask that they could create on the external view.

Figure 4:
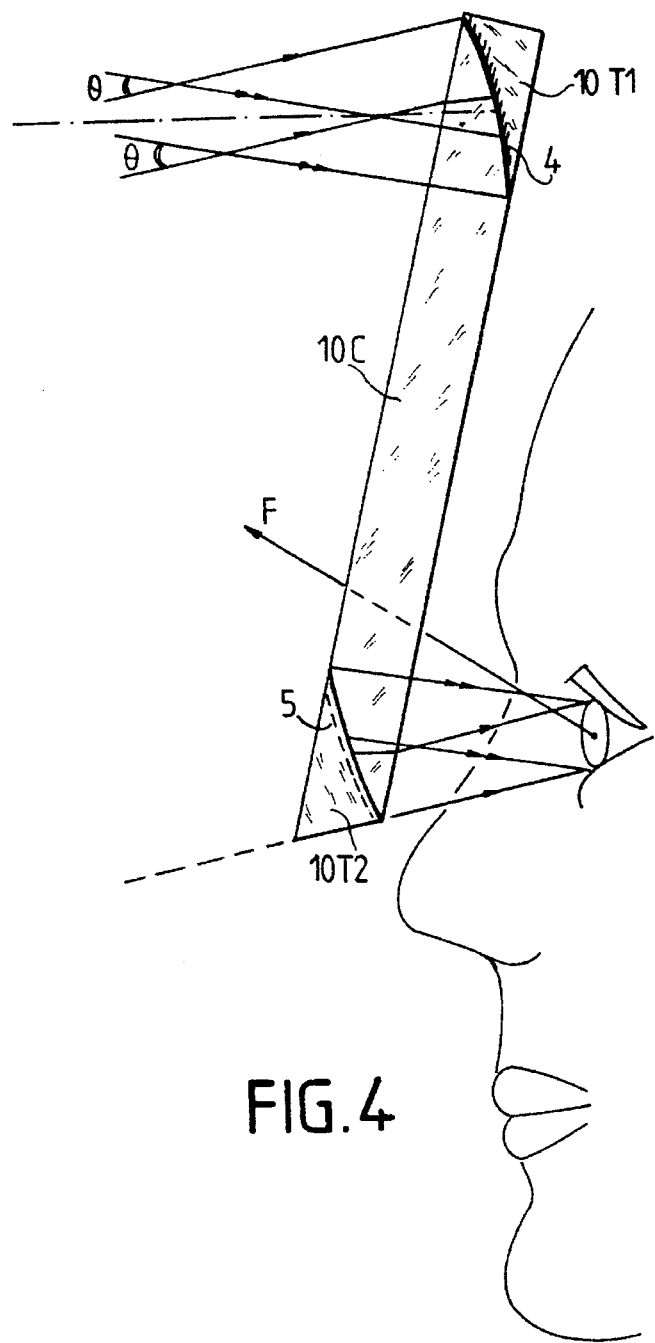
FIG. 4 is a simplified drawing showing the arrangement of a system with reference to an observer.
Figure 5:
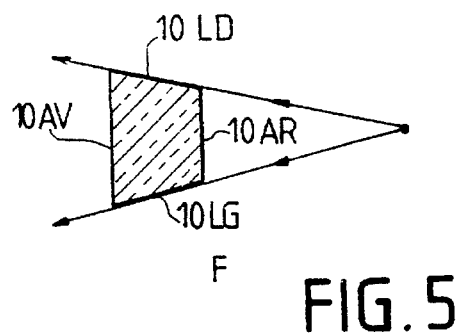
FIG. 5 is a sectional view along one direction of display to show how a mask effect can be prevented.

FIG. 5 shows a cross-section of the plate along a direction F indicated in FIG. 4 to illustrate this cut of the side faces 10LG and 10LD.

To facilitate the making of the mirrors 4 and 5, the plate 10 is advantageously formed, as shown in FIG. 4, by a central element 10C and two terminal elements 10T1 and 10T2 to form, on the whole, a polyhedral type of volume, bounded by six plane faces. Those faces of these three elements that are before each other are machined as parabolic surfaces and, on these surfaces, reflecting or semi-reflecting deposits are made to form the end mirrors 4 and 5 respectively.

Furthermore, the terminal element 10T2 is cut at its lower part similarly to the lateral faces 10LD and 10LD so as to be seen exactly by the edge and so as not to create any mask effect (FIG. 4).

Figure 6:
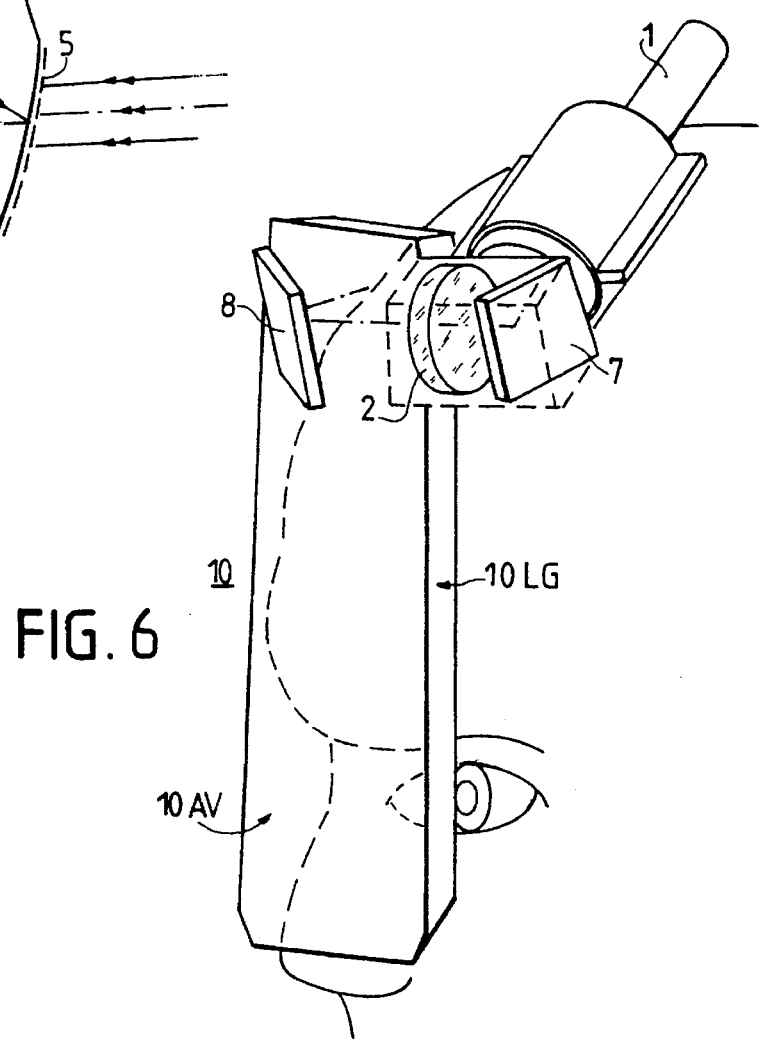
FIG. 6 is a drawing of an exemplary embodiment in the form of a helmet display unit.

Within the context of an application to a helmet display unit, FIG. 6 schematically represents the positioning of all the elements. In this depiction, the helmet is not shown and the source 1 is a miniature cathode-ray tube. The assembly additionally includes deflecting mirrors 7 and 8 to send back the light image emitted by the source 1 to the collimator 2 and to reflect it at the output of this optical device towards the first parabolic mirror 4 within the plate 10. The set formed by the cathode-ray tube 1, the deflector mirror 7 and the collimator 2 may be placed on top of the helmet as well as the deflector mirror 8. The plate device 10 comprising mirrors 4 and 5 may be integrated into the visor of the mask.

A solution according to the invention may show performance characteristics giving a field of 40 degrees in azimuth and 20 degrees in elevation. The thickness of this plate may be about 10 to 15 mm, giving a low weight for the entire unit, notably if the transparent material of the plate is a plastic.

Figure 7:
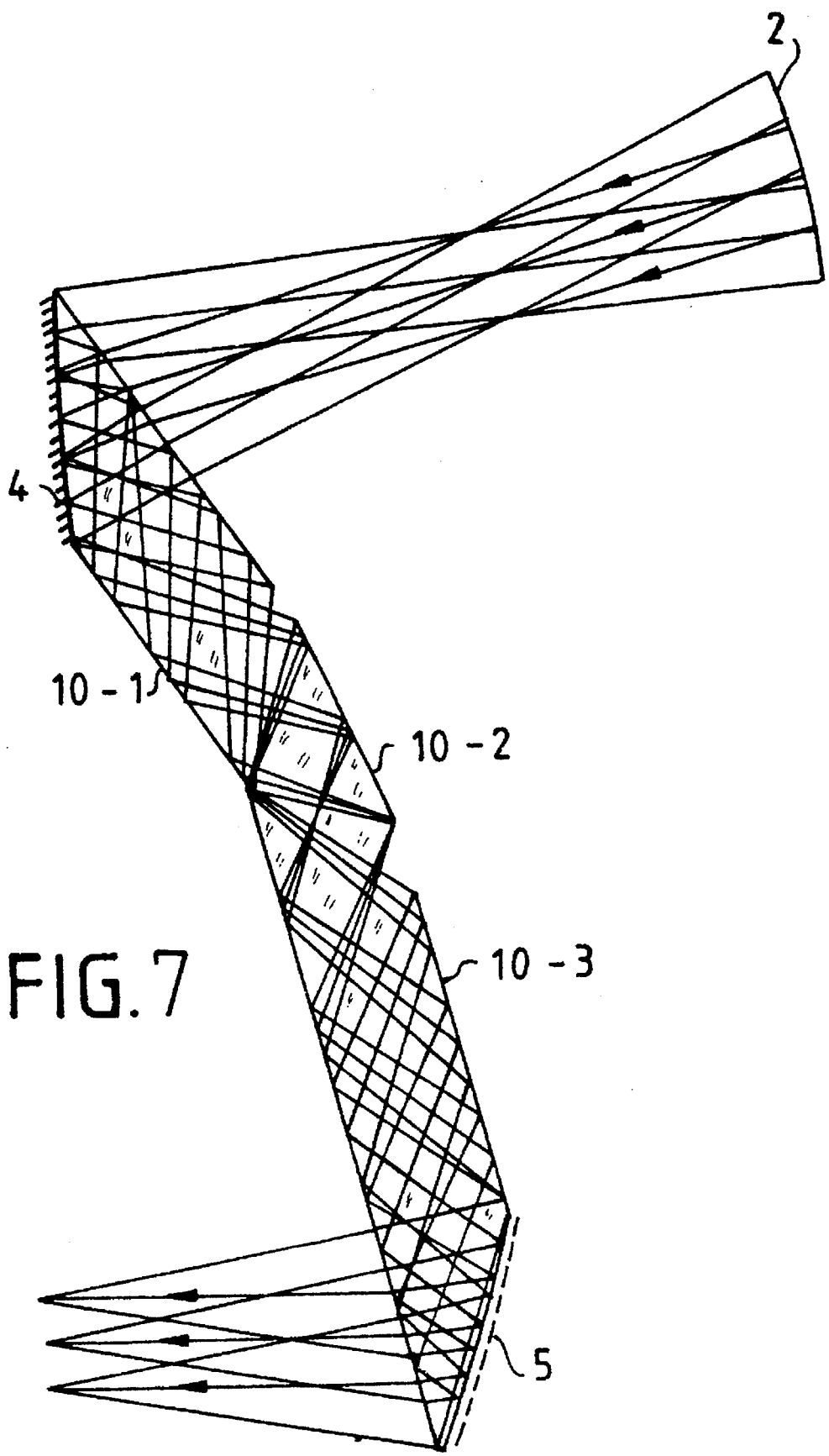
FIG. 7 is a partial drawing showing the paths taken by the rays in a so-called "folded" embodiment of the system.

FIG. 7 represents the paths taken by the rays in the case of a folded version of the central element 10C of the plate device 10 which is formed by three successive elements 10-1, 10-2, 10-3, as shown. In certain cases, this folded version may be more easy to mount in a helmet.

In general, and as indicated in the description of FIG. 2, two systems according to the invention, respectively designed for the right eye and for the left eye, enable a binocular helmet display unit to be formed.

What is claimed is:

1. An optical system of collimation comprising, in series: a source of images to provide a light radiation, a collimation objective to collimate the radiation, a combiner comprising a confocal assembly with a first parabolic mirror and a second parabolic mirror and a transparent plate, the first mirror being reflective to reflect the collimated radiation towards the second mirror, and the second mirror being partially transparent to enable, simultaneously, the transmission by reflection, towards an observer, of the radiation received from the first mirror, and the transmission by transparency, towards the observer, of an external radiation, the transparent plate having two ends, a first face and a second face which are parallel, the two ends being formed, respectively, by the two parabolic mirrors, and wherein an optical path of the collimated radiation between the objective and the observer comprises, subsequently, a first crossing of one of the two parallel faces, a reflection on the first mirror, several total reflections on the parallel faces, a reflection on the second mirror and a second crossing of one of the two parallel faces, wherein the plate is formed by several elements, each of the two parallel faces being formed by a surface for each element, and the surfaces being arranged so as to constitute a folded version of the system.

* * * * *